United States Patent Office 3,804,866
Patented Apr. 16, 1974

3,804,866
OESTROGENICALLY HIGHLY ACTIVE STEROIDS AND A PROCESS FOR THEIR MANUFACTURE
Georg Anner and Jaroslav Kalvoda, Basel, Switzerland, assignors to Ciba-Geigy Corporation, Ardsley, N.Y.
No Drawing. Filed Apr. 21, 1971, Ser. No. 136,170
Claims priority, application Switzerland, Apr. 24, 1970, 6,219/70; 6,220/70
Int. Cl. C07c 169/08
U.S. Cl. 260—397.5        3 Claims

ABSTRACT OF THE DISCLOSURE

The invention relates to the new 3-cyclopentyl ether of 7α-methyl-3,16α,17α- and 7α-methyl-3,16α,17β-trihydroxy-$\Delta^{1,3,5(10)}$-oestratrienes and their 16,17-diacetates.

Use as oestrogenic agents or as agent for the control of fertility.

---

The present invention relates to the 3-cyclopentyl ether of 7α-methyl-3,16α,17-trihydroxy-$\Delta^{1,3,5(10)}$-oestratriene of formula

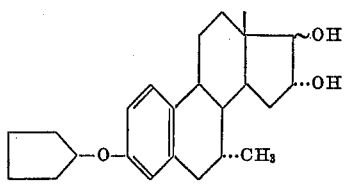

(I)

wherein the 17-hydroxy group is in the α- or β-position, and its 16,17-diacetate.

These compounds possess valuable pharmacological properties. Thus they above all exert an oestrogenic, uterotropic and/or blastocyte-implantation-inhibiting effect. The oestrogenic activity can for example be demonstrated by a single peroral administration in the vaginal keratinization test. In this test the 16,17-diols are effective in doses of 0.1–10 mg./kg. and the 16α,17α-diacetate in doses of 0.1 to 3 mg./kg. The uterotropic property is observed in female rats after a single peroral administration of these compounds at doses of 1–10 mg./kg. The blastocyte-implantation-inhibiting activity can be demonstrated on normal rats after copulation by means of a single dose of the 16α,17α-diol of 0.03 to 0.3 mg./kg. and of the 16α,17α-diol of 0.1 to 0.3 mg./kg. and the disturbance of the vaginal and ovulatory cycles of the female rat can be overcome by means of a single peroral administration of 1 mg./kg. The new compounds can thus be used as oestrogenic agents and for the control of fertility.

The new compounds can be manufactured according to methods which are in themselves known. Thus, for example, a compound of formula

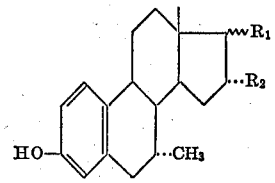

(II)

wherein $R_1$ and $R_2$ represent a free or esterified hydroxyl group, can be selectively etherified with cyclopentanol in the 3-position and the radicals $R_1$ and $R_2$ optionally converted into the free hydroxyl group or the acetoxy group.

An esterified hydroxyl group is, for example, a hydroxyl group esterified with an organic carboxylic acid, such as with an aliphatic, cycloaliphatic, aromatic, araliphatic or heterocyclic carboxylic aid, primarily an acid of this kind with at most 20 carbon atoms, especially a lower aliphatic carboxylic acid, for example formic, acetic, propionic or butyric acid, or a benzoic acid which is optionally substituted by lower alkyl, such as methyl, or lower alkoxy, such as methoxy, groups, or a carbonic acid esterified with a lower aliphatic radical, such as methylcarbonic or ethylcarbonic acid.

In most cases the etherification is carried out by reacting a compound of Formula II or a salt thereof, for example the sodium or potassium salt, with a reactive ester of cyclopentanol, optionally in the presence of a basic catalyst, such as sodium or potassium carbonate, hydroxide or alcoholate, such as methanolate or ethanolate. As reactive esters, those with strong inorganic or organic acids, such as hydrogen halide acids, especially hydrochloric or hydrobromic acids, sulphuric acid or an organic sulphonic acid, a methanesulphonic, ethanesulphonic or an optionally substituted benzenesulphonic acid, primarily benzenesulphonic acid itself, p-chlorobenzenesulphonic or p-toluenesulphonic acid, are preferably used.

A further possibility for the manufacture of the new compounds consists of reducing a compound of formula

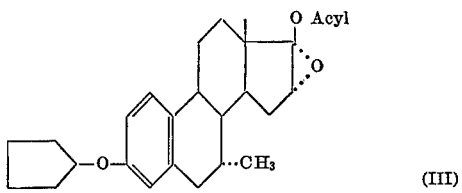

(III)

wherein the acyl radical represents the radical of a lower aliphatic carboxylic acid, especially of acetic acid, and isolating the 16α,17α- respectively the 16α,17β-dihydroxy compound from the reaction and, if desired, acetylating the resulting diol.

This reaction also takes place in a manner which is in itself known. Preferably a light metal hydride, for example lithium aluminum hydride or sodium borohydride is preferably used.

This reduction can, however, also be carried out catalytically, for example with hydrogen in the presence of a platinum catalyst.

In the course of this reduction the 16α,17β-dihydroxy compound is also obtained in addition to the 16α,17α product.

The desired product is separated from the reaction mixture that optionally contains isomeric compounds in known manner, for example by fractioned crystallization or chromatography.

The compounds with the oxy groups in the 16α,17α-position can also be obtained if a compound of formula

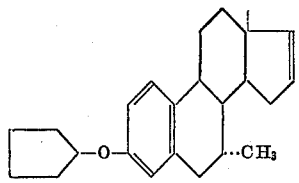

(IV)

is treated with osmium tetroxide and the resulting osmiate is reductively split and, if desired, the resulting 16α,17α-diol is aceylated.

This reaction also takes place in a manner which is in itself known. The reductive splitting of the osmiate can for example be effected by means of an aqueous solution of mannitol, or sodium bisulphite, or by means of lithium aluminium hydride.

In resulting compounds wherein $R_1$ and/or $R_2$ denote esterified hydroxyl groups which are different from the acetoxy group, these groups are split in a manner which is in itself known, for example hydrolytically or hydrogenolytically. A resulting 16,17-diacetoxy compound can also be split to the 16,17-diol if desired. A resulting 16,17-dihydroxy compound can, if desired, be converted into the diacetate in the customary manner.

The compounds with the oxy groups in the 16α,17β-position can also be obtained by reducing a compound of the formula

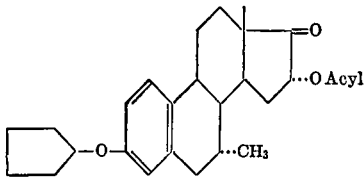

wherein the acyl radical represents the radical of a lower aliphatic carboxylic acid, especially acetic acid, and if desired, acylating the resulting 16α,17β-diol.

This reduction takes place likewise in known manner. Preferably a light-metal hydride, for example lithium aluminium hydride or sodium borohydride, is used. This reaction can also be carried out catalytically, for example with hydrogen in the presence of a platinum catalyst.

Starting substances of Formula II are known, whilst the starting substances of Formulae III, IV and V can be obtained in a manner which is in itself known, for example by esterification of the corresponding 3-hydroxy compounds with cyclopentanol.

In the above definitions, the term "lower" denotes a radical with 1–5 carbon atoms.

The new compounds can be used as medicines in the form of pharmaceutical preparations which contain these compounds together with pharmaceutical, organic or inorganic, solid or liquid excipients which are suitable for enteral, especially oral or parenteral, administration. Possible substances for forming the excepients are those which do not react with the new compounds, such as for example water, gelatine, lactose, starch, magnesium stearate, talc, vegetable oils, benzyl alcohols, gum, polyalkylene glycols, cholesterol or other known medicinal excipients. The pharmaceutical preparations can for example be in the form of tablets, dragées, or capsules or in a liquid form as solutions, suspensions or emulsions. They are optionally sterilized and/or contain auxiliary substances such as preservatives, stabilizers, wetting agents or emulsifiers, salts for regulating the osmotic pressure or buffers. They can also contain yet further therapeutically valuable substances. The pharmaceutical preparations are obtained according to methods which are in themselves customary.

The new compounds can also be used in veterinary medicine, for example in one of the abovementioned forms, or in the form of feedstuffs or of additives for animal fodder. Here the usual extenders and diluents or feedstuffs can for example be used.

The invention also relates to those embodiments of the process in which a starting product is formed under the reaction conditions or in which one starts from an intermediate product obtainable at any stage of the process and carries out the missing stages or stops the process or any stage, as well as the new intermediate products.

The examples which follow illustrate the invention without, however, being limitative thereof.

EXAMPLE 1

A suspension of 7.50 g. of potassium carbonate in 7.25 ml. of cyclopentyl bromide is mixed at room temperature whilst stirring, with a solution of 5.00 g. of 3,16α,17α-trihydroxy-7α-methyl-$\Delta^{1,3,5(10)}$-oestratriene in 150 ml. of ethanol and the whole is boiled for 16 hours under reflux. The cooled mixture is poured onto about 600 ml. of ice/water and twice extracted with chloroform. The organic phases are successively washed with water, 2 N hydrochloric acid, water, 1 N sodium hydroxide solution and water, dried and evaporated in a waterpump vacuum. The crude product thus obtained is chromatographed on silica gel and yields the pure 3-cyclopentyloxy-7α-methyl-16α,17α-dihydroxy-$\Delta^{1,3,5(10)}$-oestratriene. The compound is in the form of a colorless varnish. Ultraviolet spectrum: 280 nm. ($\epsilon$=2000), 288 nm. ($\epsilon$=1900). $[\alpha]_D$=+34° (CHCl$_3$).

EXAMPLE 2

5.5 g. of 3-cyclopentyloxy-7α-methyl-16α,17α-dihydroxy-$\Delta^{1,3,5(10)}$-oestratriene are dissolved in 35 ml. of pyridine and mixed with 35 ml. of acetic anhydride, and the whole is left to stand for 18 hours at room temperature. The reaction mixture is poured out onto ice/water, stirred for 1 hour and worked-up with ether in the customary manner. The resulting crude product is chromatographed on silica gel and yields the pure amorphous 3-cyclopentyloxy-7α-methyl - 16α,17α - diacetoxy-$\Delta^{1,3,5(10)}$-oestratriene. Ultraviolet spectrum: 223 nm. ($\epsilon$=9000), 279 nm. ($\epsilon$=2000) and 288 nm. ($\epsilon$=1870). $[\alpha]_D$=+14° (CHCl$_3$).

EXAMPLE 3

5.00 g. of 3-cyclopentyloxy-7α-methyl-16α,17α-diacetoxy-$\Delta^{1,3,5(10)}$-oestratriene are dissolved in 80 ml. of methanol and after adding a solution of 2.5 g. of potassium hydroxide in 20 ml. of water the mixture is stirred for 20 hours at room temperature. The reaction mixture is poured onto water and twice extracted with ether. The organic solutions are washed four times with water, dried and evaporated in a waterpump vacuum. The resulting crude diol is chromatographed on silica gel to purify it. The pure, noncrystalline 3-cyclopentyloxy-7α-methyl-16α,17α - dihydroxy - $\Delta^{1,3,5(10)}$ - oestratriene is thus obtained, which is identical with the product described in Example 1.

EXAMPLE 4

4.5 g. of 3-cyclopentyloxy-7α-methyl-$\Delta^{1,3,5(10),16}$-oestratetraene are dissolved in 450 ml. of absolute ether and 4.5 ml. of pyridine and mixed at room temperature with 4.1 g. of osmium tetroxide in 60 ml. of absolute ether, and the mixture is left to stand for 3 days at room temperature with exclusion of light. The osmium ester is filtered off, rinsed with ether and boiled with 420 ml. of 95% strength ethyl alcohol and 420 ml. of 5% strength sodium hydrogen sulphite solution for 2 hours under reflux. After cooling to room temperature, the osmium which has precipitated is separated off through Celite, the filtrate is concentrated in a waterpump vacuum, and the residue is mixed with water and twice extracted with chloroform. The organic solutions are washed with water, dried and evaporated in a waterpump vacuum. The resulting crude product is dissolved in toluene and chromatographed on a 50-fold amount by weight of silica gel. The pure amorphous 3-cyclopentyloxy-7α-methyl-16α,17α-dihydroxy-$\Delta^{1,3,5(10)}$-oestratriene is thus obtained. $[\alpha]_D$=+32°.

The 3-cyclopentyloxy-7α-methyl-$\Delta^{1,3,5(10),16}$-oestratetraene which serves as the starting material is obtained by reacting the corresponding free 3-hydroxy compound with cyclopentyl bromide under the conditions indicated in Example 1.

EXAMPLE 5

A solution of 7.7 g. of 3-cyclopentyl-17-acetoxy-7α-methyl-16α,17α-epoxy-$\Delta^{1,3,5(10)}$-oestratriene in 285 ml. of tetrahydrofurane is added at about 10–15° C. to a suspension of 2.85 g. of lithium aluminum hydride in 285 ml. of tetrahydrofurane and after rinsing down with 140 ml. of tetrahydrofurane the whole is boiled for 2 hours under a reflux condenser. 30 ml. of ethyl acetate are carefully added at about 10° C. followed by 550 ml. of 2 N hydrochloric acid and then 1 l. of chloroform, the mixture is stirred for 10 minutes at room temperature, and the organic layer is separated off. The extract is washed with water, dried over sodium sulphate and evaporated to dryness in a waterpump vacum. After adsorption of the resulting foam on a 50-fold amount of silica gel and elution with a mixture of toluene and ethyl acetate (95:5), the amorphous 3-cyclopentyloxy-7α-methyl-16α, 17α - trihydroxy - $\Delta^{1,3,5(10)}$ - oestratriene is obtained. $[\alpha]_D = +32°$.

The 3 - cyclopentyloxy - 7α - methyl - 16α,17α - epoxy- $\Delta^{1,3,5(10)}$-oestratriene which serves as the starting material is obtained by etherification of 7α-methyl-oestrone with cyclopentanol, conversion of the resulting 3-cyclopentyl-ether into the 17-enol-acetate, for example by warming with acetic anhydride in pyridine, and reaction of the resulting 17-enol-acetate with m-chloro-perbenzoic acid.

EXAMPLE 6

A solution of 5.00 grams of 3,16α,17β-trihydroxy-7α-methyl-$\Delta^{1,3,5(10)}$-oestratriene in 150 ml. of ethanol is added dropwise to a suspension, stirred at room temperature, of 7.50 grams of potassium carbonate in 7.25 ml. of cyclopentyl bromide. The reaction mixture is then stirred for 17 hours under nitrogen, it is then filtered, water and ether are added, the organic layer is washed three times with water, once with dilute sulphuric acid, twice with a dilute solution of caustic soda, and again twice with water, dried, and concentrated under reduced pressure produced by a water jet pump until crystallization sets in. After reprecipitating the crude product obtained from toluene there is obtained the pure cyclopentyl ether of 7α-methyl-oestratriol melting at 106 to 113° C.

EXAMPLE 7

2.0 grams of 3 - cyclopentyloxy - 7α-methyl-16α,17α-epoxy - 17β-acetoxy-$\Delta^{1,3,5(10)}$-oestratriene are dissolved in 100 ml. of tetrahydrofurane, and the solution is added dropwise to a stirred suspension of 2.0 grams of lithium aluminium hydride in 150 ml. of tetrahydrofurane. The reaction mixture is stirred for a further 50 minutes at about 40° C., it is then cooled, there are then added dropwise 10 ml. of ethyl acetate in 40 ml. of tetrahydrofurane and then 5 ml. of water in 30 ml. of tetrahydrofurane, the precipitated aluminium hydroxide is filtered off, and the filtrate is evaporated under reduced pressure produced by a water jet pump. By subjecting the crude product to chromatography over silica gel and then crystallizing there is obtained pure 3-cyclopentyloxy-7α-methyl-16α,17β-dihydroxy-$\Delta^{1,3,5(10)}$-oestratriene melting at 107–114° C. ($[\alpha]_D^{20} = +47°$ (in chloroform).

The cyclopentyl ether used as starting material is obtained from 7α-methyl-oestrone by etherification, for example, with cyclopentyl bromide, then enol-acetylation by means of acetic anhydride in pyridine, and epoxidation of the resulting 3-cyclopentyloxy-7α-methyl-17-acetoxy-$\Delta^{1,3,5(10)16}$-oestratriene with a per-acid, for example, with m-chloro-perbenzoic acid in methylene chloride.

EXAMPLE 8

1.50 grams of 3-cyclopentyloxy-7α-methyl-16α-acetoxy-17-oxo-$\Delta^{1,3,5(10)}$-oestratriene in 70 ml. of absolute tetrahydrofurane at about 5–10° C. are added dropwise to a suspension of 600 mg. of lithium aluminium hydride in 30 ml. of absolute tetrahydrofurane, the reaction mixture is rinsed out with 50 ml. of tetrahydrofurane and boiled for 4 hours under a reflux condenser.

The mixture is cooled to about 5° C. and there are added dropwise in succession 5 ml. of ethyl acetate in 10 ml.

of tetrahydrofurane and 4.5 ml. of water in 10 ml. of tetrahydrofurane, and the whole is filtered with suction to remove preciptiated inorganic constituents and evaporated under reduced pressure produced by a water jet pump. By crystallizing the resulting amorphous crude product from toluene there is obtained 3-cyclopentyloxy-7α-methyl-16α,17β-dihydroxy-$\Delta^{1,3,5(10)}$-oestratriene melting at 106–112° C. obtained from 7α-methyl-oestrone by etherification, for example, with cyclopentyl bromide, then enol-acetylation by heating a pyridine solution of the cyclopentyl ether with acetic anhydride, epoxidizing the resulting $\Delta^{16}$-enol-acetate with m-chloroperbenzoic acid and mild acid hydrolysis of the epoxide.

We claim:

1. The 3-cyclopentyl ether of 7α-methyl-3,16α,17-trihydroxy-$\Delta^{1,3,5(10)}$-oestratriene of the formula

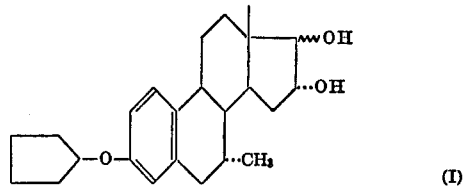

(I)

and the 16,17-diacetates thereof.

2. The 3-cyclopentyl ether of 7α-methyl-3,16α,17β-trihydroxy-$\Delta^{1,3,5(10)}$-oestratriene of the formula

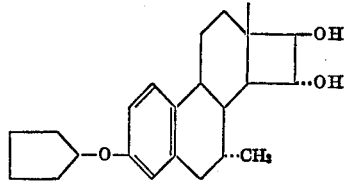

3. The 3-cyclopentyl ether of 7α-methyl-3,16α,17α-trihydroxy-$\Delta^{1,3,5(10)}$-oestratriene of the formula

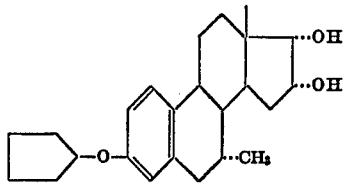

and the diacetate thereof.

References Cited

UNITED STATES PATENTS

| | | | |
|---|---|---|---|
| 3,340,279 | 9/1967 | De Jongh et al. | 260—397.4 |
| 3,492,321 | 1/1970 | Crabbe | 260—397.4 |
| 3,520,882 | 7/1970 | Cross et al. | 260—239.55 |

OTHER REFERENCES

Ercoli et al.: Endrocrinology, vol. 71, p. 593–597 (1962).

HENRY A. FRENCH, Primary Examiner

U.S. Cl. X.R.

424—238

UNITED STATES PATENT OFFICE
CERTIFICATE OF CORRECTION

Patent No. 3,804,866      Dated April 16, 1974

Inventor(s) GEORG ANNER ET AL

It is certified that error appears in the above-identified patent and that said Letters Patent are hereby corrected as shown below:

Column 6, claim 2, line 29, amend the right side of the of the structural formula to read:

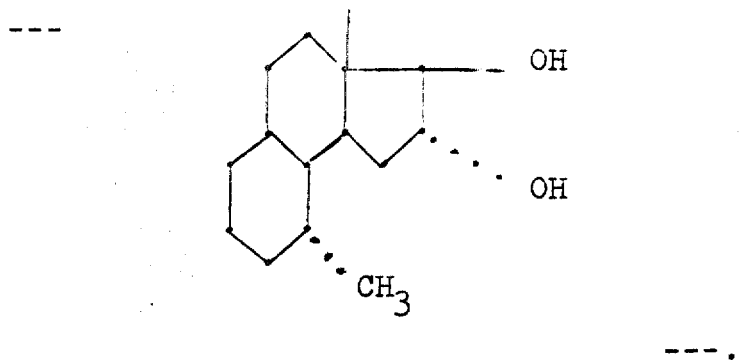

Signed and sealed this 10th day of September 1974.

(SEAL)
Attest:

McCOY M. GIBSON, JR.       C. MARSHALL DANN
Attesting Officer      Commissioner of Patents